US006568217B2

(12) United States Patent
Sudou et al.

(10) Patent No.: US 6,568,217 B2
(45) Date of Patent: May 27, 2003

(54) METHOD FOR MANUFACTURING FLUORESCENT LAMP

(75) Inventors: Kazuyoshi Sudou, Okayama (JP); Masahiro Takeuchi, Okayama (JP); Kazumasa Koyabashi, Okayama (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 128 days.

(21) Appl. No.: 09/946,285

(22) Filed: Sep. 4, 2001

(65) Prior Publication Data

US 2002/0026812 A1 Mar. 7, 2002

(30) Foreign Application Priority Data

Sep. 4, 2000 (JP) ....................................... 2000-267559

(51) Int. Cl.[7] ................................................ C03B 23/13

(52) U.S. Cl. ............................... 65/54; 65/105; 65/108; 65/112; 65/113; 65/60.4; 65/155

(58) Field of Search ............................ 65/54, 108, 112, 65/113, 36, 60.4, 153, 155, 105, 166

(56) References Cited

U.S. PATENT DOCUMENTS 4,648,850 A * 3/1987 Lima et al. .................... 445/22
4,725,298 A * 2/1988 Takeda et al. ................. 65/23
6,148,638 A * 11/2000 Oga et al. .................... 65/59.2

FOREIGN PATENT DOCUMENTS

| | | | |
|---|---|---|---|
| JP | 61-247631 | * 11/1986 | 65/36 |
| JP | 63-107830 | 5/1988 | |
| JP | 63-134528 | * 6/1988 | 65/36 |
| JP | 63-242936 | * 10/1988 | 65/108 |

OTHER PUBLICATIONS

Abstract of JP 63–242936.*

* cited by examiner

*Primary Examiner*—James Derrington
(74) *Attorney, Agent, or Firm*—Merchant & Gould, P.C.

(57) ABSTRACT

A method for manufacturing a fluorescent lamp that can achieve stable luminous characteristics and discharge characteristics and also does not suffer from cracks in the interconnected portion of the glass tubes while handling or lighting the fluorescent lamp is provided. Interconnecting portions located in the vicinity of open end portions of glass tubes that are positioned adjacent to each other are heated respectively from inside to form a welding portion, and then, the glass tubes are thrust against each other and thinned by conducting a preliminary tapping of the welding portion from inside using hammers. Next, the welding portion is opened by conducting a main tapping to form an interconnected portion, and end portions in the vicinity of the interconnected portion are closed by heating and melting, and then the end portions are molded.

18 Claims, 5 Drawing Sheets

METHOD FOR MANUFACTURING FLUORESCENT LAMP

BACKGROUND OF THE INVENTION

1. Field of the Invention

The present invention relates to a method for manufacturing a fluorescent lamp having an interconnected portion in the glass tubes.

2. Description of the Related Art

In the prior art, a fluorescent lamp with a prolonged discharge path, which is achieved by interconnecting glass tubes, is known in the form of a bulb fluorescent lamp, a compact fluorescent lamp, and so forth. One means for interconnecting glass tubes as described above is, for example, as shown in JP63(1988)-107830A, to heat and melt interconnecting portions of parallel arranged glass tubes respectively from inside the glass tubes by burners, to interconnect the glass tubes through a communicating aperture formed by the wind pressure of the burners, to pinch and close the tube end portions, and then to reheat the tube end portions and put them into a predetermined mold for forming the tube ends into a predetermined shape. In addition, another way of forming a communicating aperture by the above-mentioned interconnecting means has been tried, in which the inner walls of the heated glass tubes are thinned by lightly tapping them once or twice with small metal plates from inside the glass tubes, and then, the thinned parts of the glass tubes are blown open by the wind pressure of the burners to form apertures.

However, in the case of using the conventional means for forming an interconnected portion in glass tubes mentioned above, when the aperture is formed only by the wind pressure of a burner, due to the sharpness of the flames from the burner nozzle, the aperture has a small diameter, and thus the discharge path of the glass tubes partially has a smaller diameter, so that the luminous characteristics of the fluorescent lamp may become unstable. Furthermore, in the case of thinning the glass tube in advance and opening the glass tube by the wind pressure of the burner, since the glass thickness in the interconnected portion varies due to a change in the direction and the wind pressure of the burner flames, extremely thin portions and extremely thick portions are created in the upper, lower or lateral parts of the interconnected portion, thereby causing distortion. As a result, there was a problem of causing a crack failure in the interconnected portion during the manufacturing process of the fluorescent lamp or while lighting the completed fluorescent lamp.

SUMMARY OF THE INVENTION

The present invention solves the conventional problems described above in such a manner that the aperture of the interconnected portion of the glass tubes is formed with a diameter that does not interfere with the performance of the fluorescent lamp and also that breakage of the interconnected portion is prevented during each manufacturing process or after the fluorescent lamp is completed.

In order to solve the problems described above, it is an object of the present invention to provide a method for manufacturing a fluorescent lamp, comprising heating interconnecting portions located in the vicinity of open end portions of glass tubes that are positioned adjacent to each other respectively from inside to form a welding portion, thrusting the glass tubes against each other and thinning them by conducting a preliminary tapping of the welding portion from inside using hammers, opening the welding portion by conducting a main tapping using hammers to form an interconnected portion, closing end portions in the vicinity of the interconnected portion by heating and melting, and molding the end portions.

Furthermore, in the method for manufacturing a fluorescent lamp of the present invention, it is preferable that a thickness of the glass tube is in a range of 0.75 mm to 1.50 mm.

Furthermore, in the method for manufacturing a fluorescent lamp of the present invention, it is preferable that a heating temperature for the interconnecting portions is in a range of 900° C. to 1400° C.

Furthermore, in the method for manufacturing a fluorescent lamp of the present invention, it is preferable that the hammer has an elliptical tip with a minor axis of 3 mm to 7 mm and a major axis of 4 mm to 12 mm.

Furthermore, in the method for manufacturing a fluorescent lamp of the present invention, it is preferable that a pressure of the preliminary tapping is in a range of 1.1 MPa to 2.2 MPa.

Furthermore, in the method for manufacturing a fluorescent lamp of the present invention, a pressure of the preliminary tapping and a pressure of thrusting the glass tubes against each other may be approximately the same.

Furthermore, in the method for manufacturing a fluorescent lamp of the present invention, it is preferable that a pressure of the main tapping is in a range of 1.1 MPa to 2.2 MPa, more preferably 1.8 MPa to 2.2 MPa.

Furthermore, in the method for manufacturing a fluorescent lamp of the present invention, a pressure of the main tapping may be larger than a pressure of the preliminary tapping.

Furthermore, in the method for manufacturing a fluorescent lamp of the present invention, it is preferable that an aperture of the interconnected portion has an elliptical shape with a minor axis of 3 mm to 10 mm and a major axis of 4 mm to 15 mm, more preferably with a minor axis of 3 mm to 7 mm and a major axis of 4 mm to 12 mm.

Furthermore, in the method for manufacturing a fluorescent lamp of the present invention, it is preferable that a heating temperature in the vicinity of the interconnected portion is in a range of 900° C. to 1400° C.

Furthermore, in the method for manufacturing a fluorescent lamp of the present invention, it is preferable that the molding is conducted at a temperature of 930° C. to 1200° C., more preferably 930° C. to 1030° C.

Furthermore, in the method for manufacturing a fluorescent lamp of the present invention, it is preferable that a space between the glass tubes is not less than the thickness of the glass tube.

Furthermore, in the method for manufacturing a fluorescent lamp of the present invention, it is preferable that the preliminary tapping is conducted once or twice, and the main tapping is conducted for two or more times by the hammers.

Furthermore, in the method for manufacturing a fluorescent lamp of the present invention, it is preferable that the glass tubes are at least partially uncoated by phosphor before the interconnected portion is formed.

Furthermore, in the method for manufacturing a fluorescent lamp of the present invention, cooling zones can be provided in portions where the glass tubes are molded.

Furthermore, in the method for manufacturing a fluorescent lamp of the present invention, the glass tubes may be linear or nonlinear glass tubes.

Furthermore, in the method for manufacturing a fluorescent lamp of the present invention, it is preferable that a phosphor coating is formed partially or entirely on an inner surface of the glass tube after the process of forming the interconnected portion or molding.

Furthermore, in the method for manufacturing a fluorescent lamp of the present invention, it is preferable that a thickness of the phosphor coating is in a range of 20 $\mu$m to 30 $\mu$m.

According to the method for manufacturing a fluorescent lamp of the present invention, the interconnected portion of the glass tubes can be formed by the steps of heating the interconnecting portions of glass tubes respectively from inside and softening them approximately to the melting point, lightly contacting the glass tubes against each other and thrusting and thinning them by conducting the preliminary tapping once or twice by the hammers, conducting the main tapping repeatedly for two or more times, and forming the apertures with a large diameter by partially ripping off the glass walls so as to avoid the glass walls having an uneven thickness. Therefore, a distortion occurring in the interconnected portion can be prevented. Moreover, with respect to the opening end portions of the glass tubes near the interconnected portion, as the process following the interconnection of the glass tubes, the open end portions are heated, melted and closed locally after the interconnection is completed, and then, the glass tubes are molded in the softened state to shape the end portions by using a mold of a predetermined shape. Thus, the steps from the formation of the interconnected portion to the molding of the end portions of the glass tubes can be conducted continuously, so that the production efficiency can be improved. In particular, since there is no coating such as a phosphor coating or a conductive film formed on the inner walls of the glass tubes in the interconnecting portions or in the portions where the end portions of the glass tubes are formed, the conditions for the interconnecting process and the molding process also are simple, and the problems such as unevenness and variance in the thickness, unevenness in the shape, and reduction of the glass strength can be solved.

DESCRIPTION OF THE PREFERRED EMBODIMENTS

Hereinafter, an embodiment of the present invention will be explained with reference to the drawings. FIGS. 1 to 4 are cross-sectional views showing the relevant portions of fluorescent lamps according to one example of a method for manufacturing a fluorescent lamp of the present invention. 1, 1' denote glass tubes made of a soda glass or the like; 2, 2' denote interconnecting portions; 3, 3' denote gas burners; 4, 4' denote small hammers made of a heat resisting material; 5, 5' denote open end portions of the glass tubes 1, 1'; 6 denotes interconnected portions; 7, 7' denote closed portions; 8, 8' denote cooling zones; and 9 denotes a glass tube completed with the process of interconnection and molding. 10 is a holding arm for the glass tube.

Figure 1:
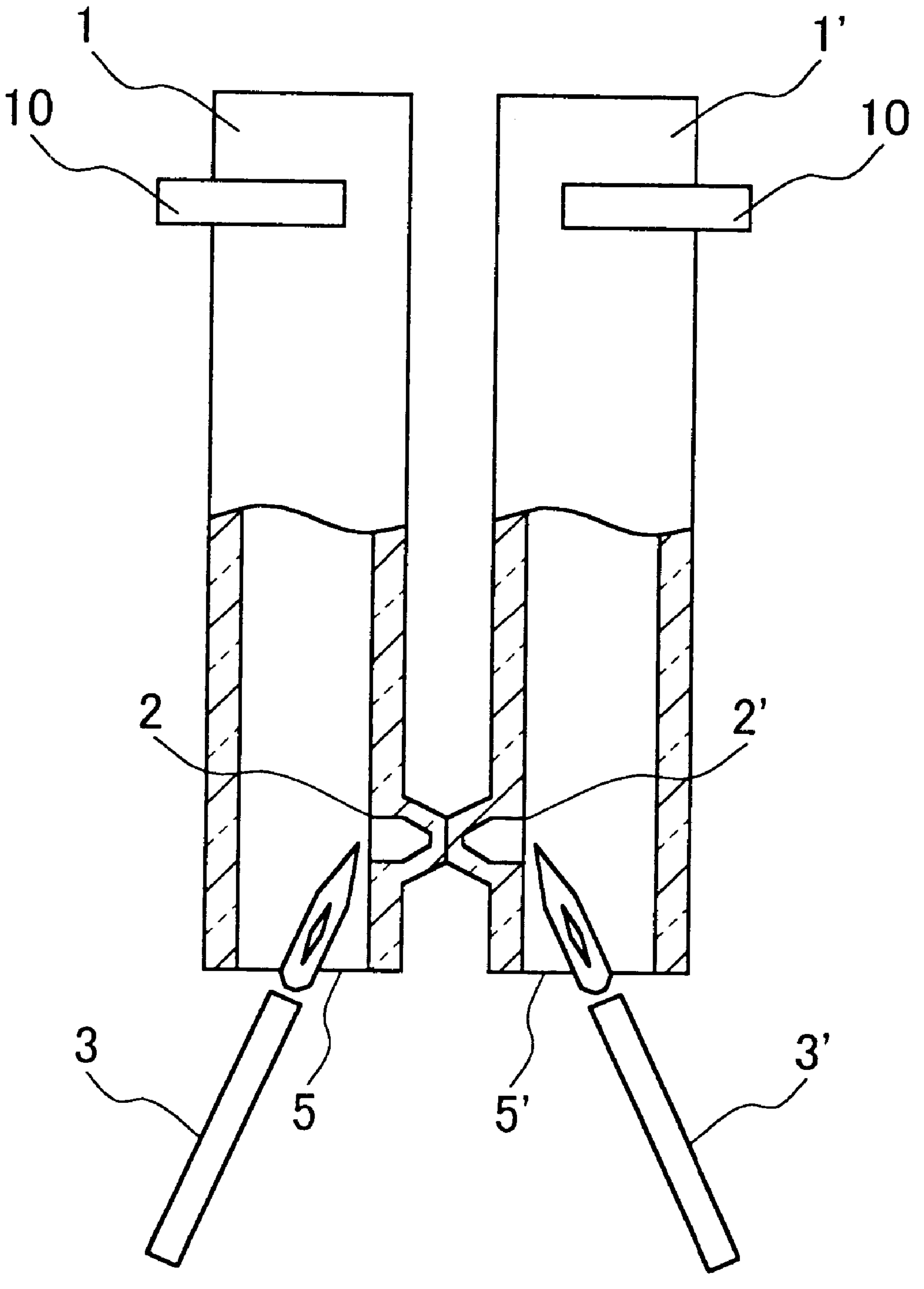
FIG. 1 is a cross-sectional view showing the relevant portion of a fluorescent lamp in the first step according to a method for manufacturing a fluorescent lamp of the present invention.
Figure 2:
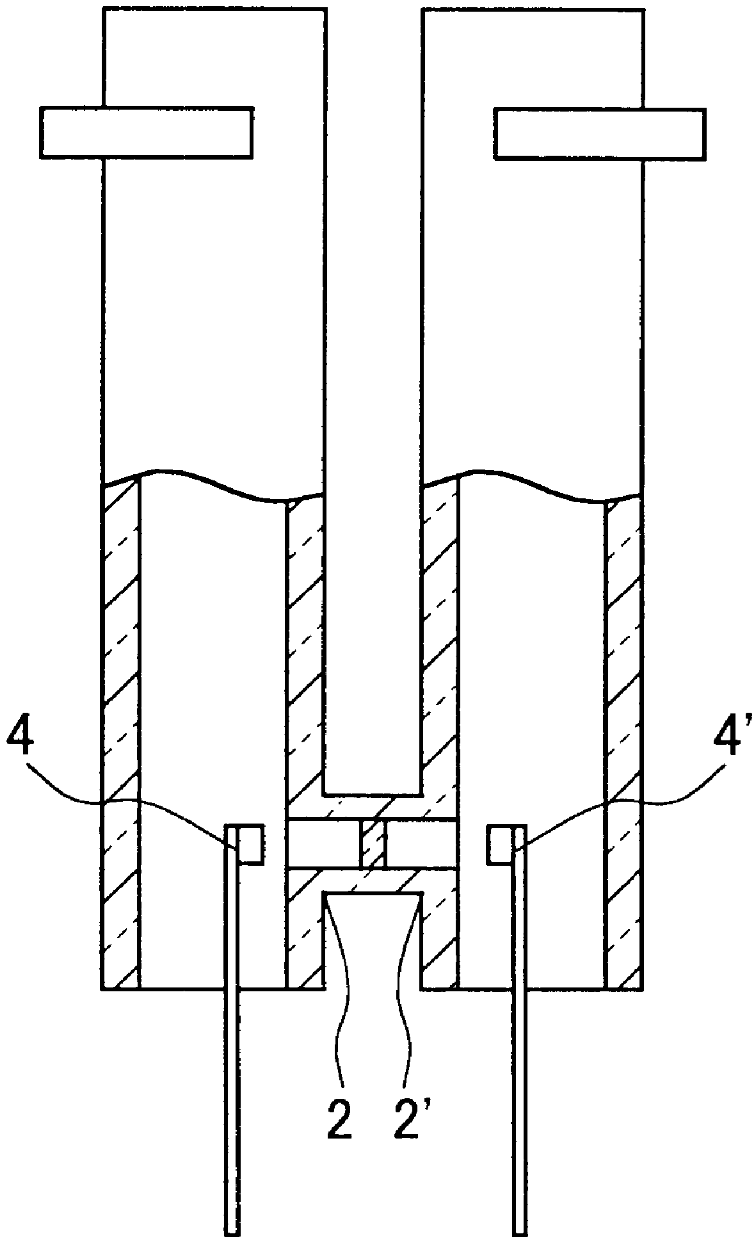
FIG. 2 is a cross-sectional view showing the relevant portion of a fluorescent lamp in the second step according to a method for manufacturing a fluorescent lamp of the present invention.
Figure 3:
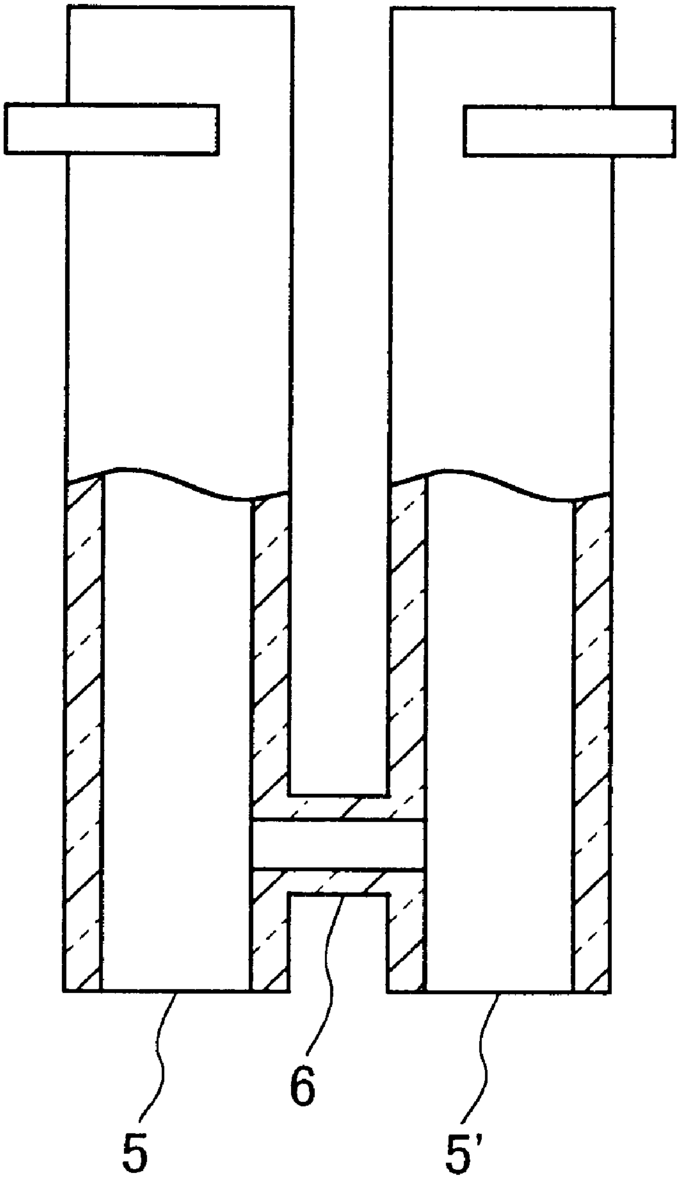
FIG. 3 is a cross-sectional view showing the relevant portion of a fluorescent lamp in the third step according to a method for manufacturing a fluorescent lamp of the present invention.

First, the glass tubes 1, 1' are held by the holding arms 10 and arranged adjacent and parallel to each other at a spacing of not less than a thickness of the glass tubes 1 and 1'. The interconnecting portions 2, 2' are heated and softened from the inside by the burners 3, 3' as shown in FIGS. 1, 2 and welded together. Then, a preliminary tapping is conducted once or twice by the small hammers 4, 4' to thrust the glass tubes against each other and to thin them. After a while, a main tapping is conducted twice or several times to open the welding portion, so that the interconnected portion 6 as shown in FIG. 3 is formed. The preliminary tapping by the small hammers 4, 4' and the thrusting of the glass tubes against each other may be conducted with almost the same pressure, and the main tapping may be conducted with a slightly higher pressure than that of the preliminary tapping.

Figure 5:
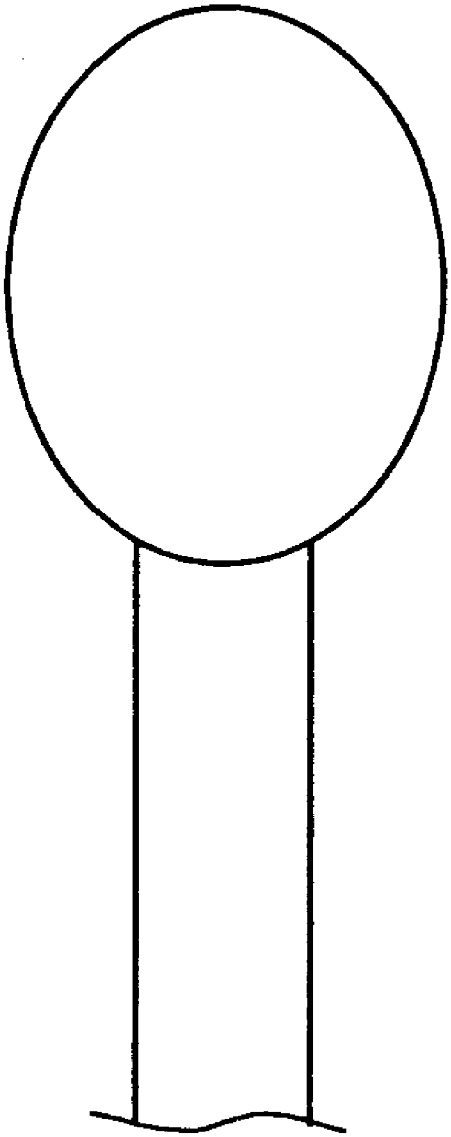
FIG. 5 is a diagram showing the tip of a small hammer from the side of the glass tube.

In addition, FIG. 5 is a diagram showing the tip of a small hammer from the side of the glass tube. The small hammer has an elliptical tip formed with a minor axis of 3 mm to 7 mm and a major axis of 4 mm to 12 mm.

Figure 4:
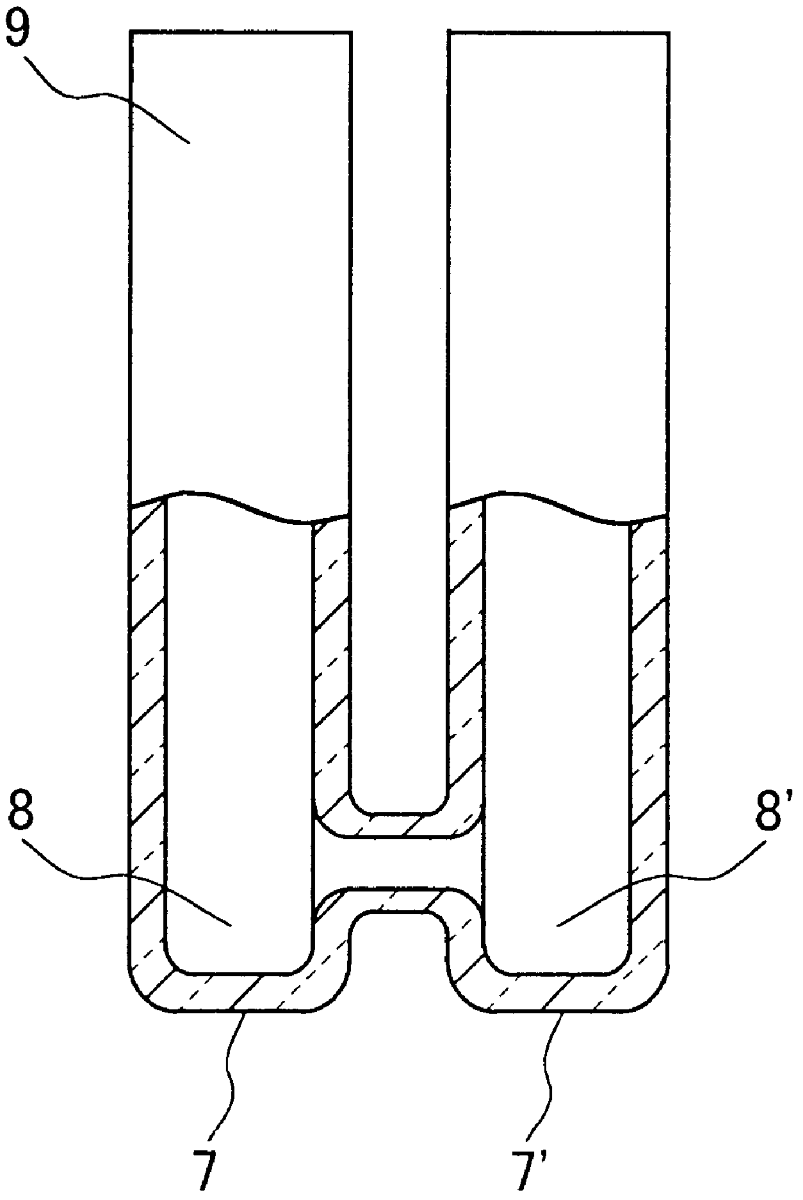
FIG. 4 is a cross-sectional view showing the relevant portion of a glass tube manufactured by a method for manufacturing a fluorescent lamp of the present invention.

Immediately after forming the interconnected portion 6, the open end portions 5, 5' in the vicinity thereof are heated and softened so as to close the end portions and to mold them into a predetermined shape. In this way, the glass tube 9 shown in FIG. 4 is completed. The cooling zones 8, 8' for controlling mercury vapor pressure are formed as necessary due to the type of the fluorescent lamp by using a mold. A coating for the inner surface of the glass tube such as a phosphor coating or a conductive coating preferably is formed after the glass tube 9 is completed, but this is not the case if this process is difficult to conduct after forming the glass tube 9.

EXAMPLE

Hereinafter, an example of the present invention will be explained.

Two glass tubes made of a soda glass, each tube having an outer diameter of 17.5 mm, a thickness of 1.2 mm, and a length of 400 mm, were used to conduct experiments for interconnecting glass tubes and molding end portions in the vicinity of an interconnected portion of a compact fluorescent lamp used exclusively for high frequency operation of 32 W. For the experiments, a fluorescent lamp (a), which is formed in accordance with the embodiment of the present invention shown in FIGS. 1 to 4, and a fluorescent lamp (b), which is formed by using glass tubes coated in advance with a phosphor coating and forming an interconnected portion by blowing and opening the interconnecting portions by the wind pressure of a burner, were produced experimentally, and various comparative evaluations were conducted.

For the experimental production of the fluorescent lamp (a), the two glass tubes without a phosphor coating were arranged and held parallel to each other at an interval of 1.5 mm, and interconnecting portions were heated and softened respectively at a temperature of 1350° C. from inside the glass tubes by burners and welded together. Then, a preliminary tapping was conducted twice with small hammers with 1.5 MPa of pressure to thrust the glass tubes against each other and to thin them. After a while, a main tapping was conducted with 2.2 MPa of pressure continuously for three times to open the welding portion. Then, any excess glass was eliminated to form an interconnected portion. Next, the end portions of the glass tubes in the vicinity of the interconnected portion were heated and softened at a temperature of 980° C. to close the open ends, and then, the end portions of the glass tubes in the softened state were fit into a mold having dents on both sides and molded at a temperature of 950° C. Thus, the glass tube 9 having the cooling zones 8, 8' as shown in FIG. 4 was formed. Next, a predetermined amount of a three wavelength region light-emitting phosphor of 5000K correlated color temperature made of a composition of $Y_2O_3$: $Eu^{3+}$, $LaPO_4$: $Ce^{3+}$, $Tb^{3+}$ and $BaMgAl_{10}O_{17}$: $Eu^{2+}$ was coated on the inner walls of the glass tubes described above. The thickness of the applied and dried phosphor coating was 23 $\mu$m. This fluorescent lamp (a) was formed such that the cross section of the interconnected portion had an elliptical cross section with a major axis of about 15 mm, and the cooling zones in the end portions of the glass tubes also had a depth of about 15 mm.

When the interconnected portions of the fluorescent lamp (a) and the fluorescent lamp (b) formed by the conventional method were compared, the cross-sectional area of the aperture of the interconnected portion was larger and more uniform in the fluorescent lamp (a), compared to the fluorescent lamp (b). Furthermore, the thicknesses on the upper and lower sides of the interconnected portion were almost the same without any cluster, and no residual distortion was observed.

On the other hand, with respect to the fluorescent lamp (b), the interconnected portion was formed by blowing and opening the glass tubes with sharp flames of the gas burner, so that the diameter as well as the cross-sectional area of the aperture were smaller than those of the fluorescent lamp (a). In addition, the shape of the aperture also was uneven and variable, and the thicknesses on the upper and lower sides of the interconnected portion were different, so that there was thickness deviation. There were also those in which a residual distortion was detected. Furthermore, since the fluorescent lamp (b) was coated in advance with a phosphor coating on the inner surface of the glass tube, phosphor particles were present in a state mixed with the glass components in the interconnected portion and in the closed end portions of the tubes, so that there were also those which were distorted.

As a result of confirming the characteristics of this fluorescent lamp (a) and the fluorescent lamp (b), with respect to the fluorescent lamp (b), a discharge was insufficient due to the small diameter of the aperture of the interconnected portion, and those lacking slightly in the luminous flux or exhibiting discharge instability were found here and there. In addition, there were also those with cracks in the interconnected portions caused by distortion before the fluorescent lamp reached its rated life of 10000 hours. On the other hand, with respect to the fluorescent lamp (a), the luminous flux as well as the discharge were stable without any variance, and the interconnected portions had no cracks until reaching its rated life.

Furthermore, by setting the spacing between the glass tubes to be larger than the thickness of these glass tubes, the periphery of the interconnected portion including the upper and lower sides of the interconnected portion is less likely to form a cluster, and the glass tubes can be thinned more easily by the preliminary tapping with the hammers. Thus, the time required for opening can be shortened.

Next, experiments of tapping and thrusting with small hammers were conducted. As a result, it was most suitable to conduct the preliminary tapping once or twice for thinning the glass tubes before the apertures are formed. When it was tapped for three or more times in succession, the operation from the thinning to the opening could be conducted continuously. Therefore, even if the object of opening was achieved, there were problems that the apertures had different shapes, and that cracks due to distortion were created by bits of melted glass remaining and sticking inside the interconnected portion.

According to the experiments, due to the steps of conducting the preliminary tapping and the thrusting, and after a while, the main tapping for two or more times, the portion thinned by the preliminary tapping could be opened in an instant by the first main tapping, and the remaining glass in the periphery of the aperture was ripped off by the second or further main tapping. Thus, the shape of the aperture could be formed uniformly with a stable size.

As described above, the method for manufacturing a fluorescent lamp of the present invention can realize the steps from the formation of an interconnected portion of glass tubes to the molding of tube ends in a smooth sequence, so that a fluorescent lamp having a uniform and strong interconnected portion and also without distortion can be formed.

In addition, in the method for manufacturing a fluorescent lamp of the present invention, the glass tubes may be linear or nonlinear glass tubes, and the present invention is not limited to the material, the size, and the type explained in the embodiment, the drawings, and the example of the present invention, and can be applied to a method for manufacturing a fluorescent lamp in a broad range.

Furthermore, the method for manufacturing a fluorescent lamp of the present invention can be applied surely, for example, to a production of fluorescent lamps or the like, which are formed by interconnecting a plurality of interconnected glass tubes, and if necessary, also to an interconnection of glass tubes coated with phosphor coatings on the inner surface.

As explained above, the method for manufacturing a fluorescent lamp of the present invention comprises heating interconnecting portions located in the vicinity of open end portions of glass tubes that are positioned adjacent to each other respectively from inside to form a welding portion, thrusting the glass tubes against each other and thinning them by conducting a preliminary tapping of the welding portion from inside using hammers, opening the welding portion by conducting a main tapping using hammers to form an interconnected portion, closing end portions in the vicinity of the interconnected portion by heating and melting, and molding the end portions. Accordingly, the fluorescent lamp manufactured thereby can achieve stable luminous characteristics and discharge characteristics. In addition, the fluorescent lamp also has the advantage of not suffering from cracks in the interconnected portion of the glass tubes while handling or lighting the fluorescent lamp, and the work steps also can be itemized and conducted surely, so that its industrial value is significant.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for manufacturing a fluorescent lamp, comprising heating interconnecting portions located in the vicinity of open end portions of glass tubes that are positioned adjacent to each other respectively from inside to form a welding portion, thrusting the glass tubes against each other and thinning them by conducting a preliminary tapping of the welding portion from inside using hammers, opening the welding portion by conducting a main tapping using hammers to form an interconnected portion, closing end portions in the vicinity of the interconnected portion by heating and melting, and molding the end portions.

2. The method for manufacturing a fluorescent lamp according to claim 1, wherein a thickness of the glass tube is in a range of 0.75 mm to 1.50 mm.

3. The method for manufacturing a fluorescent lamp according to claim 1, wherein a heating temperature for the interconnecting portions is in a range of 900° C. to 1400° C.

4. The method for manufacturing a fluorescent lamp according to claim 1, wherein the hammer has an elliptical tip with a minor axis of 3 mm to 7 mm and a major axis of 4 mm to 12 mm.

5. The method for manufacturing a fluorescent lamp according to claim 1, wherein a pressure of the preliminary tapping is in a range of 1.1 MPa to 2.2 MPa.

6. The method for manufacturing a fluorescent lamp according to claim 1, wherein a pressure of the preliminary tapping and a pressure of thrusting the glass tubes against each other are approximately the same.

7. The method for manufacturing a fluorescent lamp according to claim 1, wherein a pressure of the main tapping is in a range of 1.1 MPa to 2.2 MPa.

8. The method for manufacturing a fluorescent lamp according to claim 1, wherein a pressure of the main tapping is larger than a pressure of the preliminary tapping.

9. The method for manufacturing a fluorescent lamp according to claim 1, wherein an aperture of the interconnected portion has an elliptical shape with a minor axis of 3 mm to 10 mm and a major axis of 4 mm to 15 mm.

10. The method for manufacturing a fluorescent lamp according to claim 1, wherein a heating temperature in the vicinity of the interconnected portion is in a range of 900° C. to 1400° C.

11. The method for manufacturing a fluorescent lamp according to claim 1, wherein the molding is conducted at a temperature of 930° C. to 1200° C.

12. The method for manufacturing a fluorescent lamp according to claim 1, wherein a space between the glass tubes is not less than the thickness of the glass tube.

13. The method for manufacturing a fluorescent lamp according to claim 1, wherein the preliminary tapping is conducted once or twice, and the main tapping is conducted for two or more times by the hammers.

14. The method for manufacturing a fluorescent lamp according to claim 1, wherein the glass tubes are at least partially uncoated by phosphor before the interconnected portion is formed.

15. The method for manufacturing a fluorescent lamp according to claim 1, wherein cooling zones are provided in portions where the glass tubes are molded.

16. The method for manufacturing a fluorescent lamp according to claim 1, wherein the glass tubes are linear or nonlinear glass tubes.

17. The method for manufacturing a fluorescent lamp according to claim 14, wherein a phosphor coating is formed partially or entirely on an inner surface of the glass tube after the process of forming the interconnected portion or molding.

18. The method for manufacturing a fluorescent lamp according to claim 17, wherein a thickness of the phosphor coating is in a range of 20 μm to 30 μm.

* * * * *

UNITED STATES PATENT AND TRADEMARK OFFICE

CERTIFICATE OF CORRECTION

PATENT NO. : 6,568,217 B2

DATED : May 27, 2003

INVENTOR(S) : Sudou et al.

It is certified that error appears in the above-identified patent and that said Letters Patent is hereby corrected as shown below:

Title page,

Item [75], Inventors, "Kazumasa Koyabashi" should read -- Kazumasa Kobayashi --

Signed and Sealed this

Twenty-seventh Day of January, 2004

JON W. DUDAS

*Acting Director of the United States Patent and Trademark Office*